Figure 1:
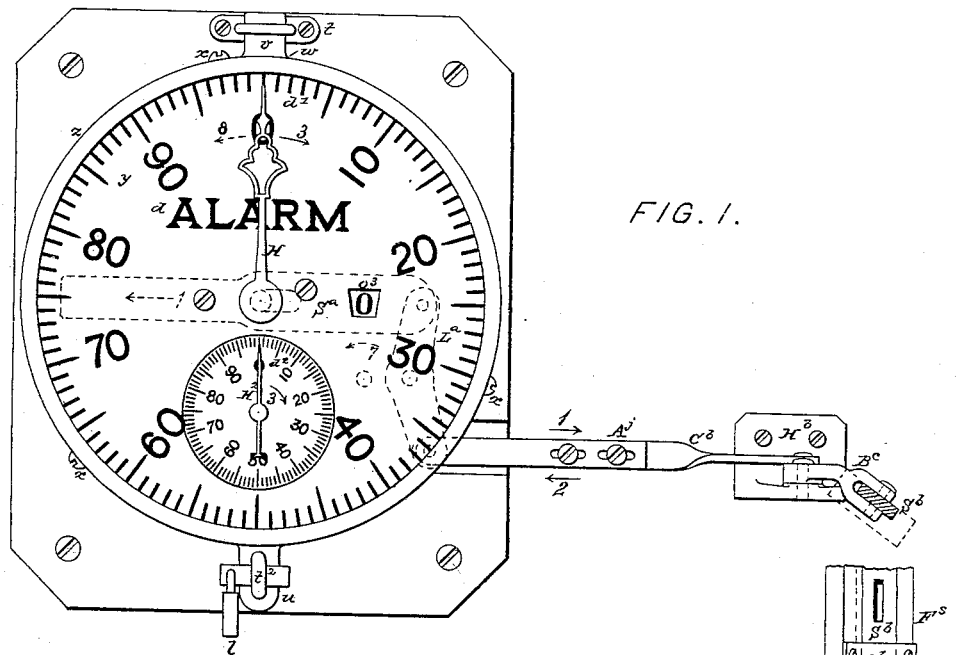

3 Sheets—Sheet 1.

J. W. FOWLER & D. F. LEWIS.
Passenger-Register.

No. 206,553. Patented July 30, 1878.

WITNESSES:
Edwd. D. Mackintosh.
Sidor Grayhead

INVENTORS:
John W. Fowler
Daniel F. Lewis
By Knight Bros.
Attorneys.

N. PETERS, PHOTO-LITHOGRAPHER, WASHINGTON, D.C.

3 Sheets—Sheet 2.
J. W. FOWLER & D. F. LEWIS.
Passenger-Register.
No. 206,553. Patented July 30, 1878.
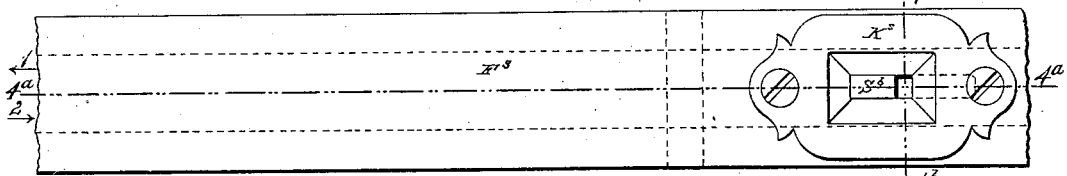
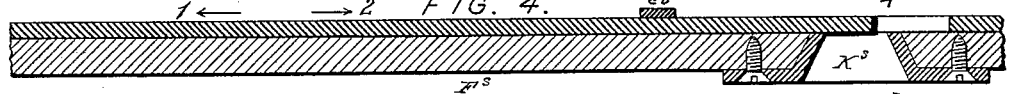
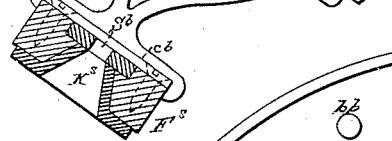
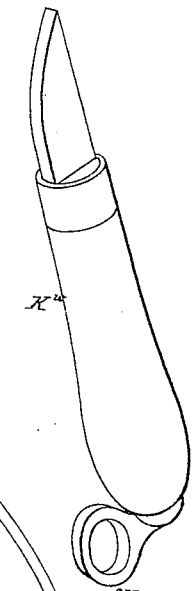
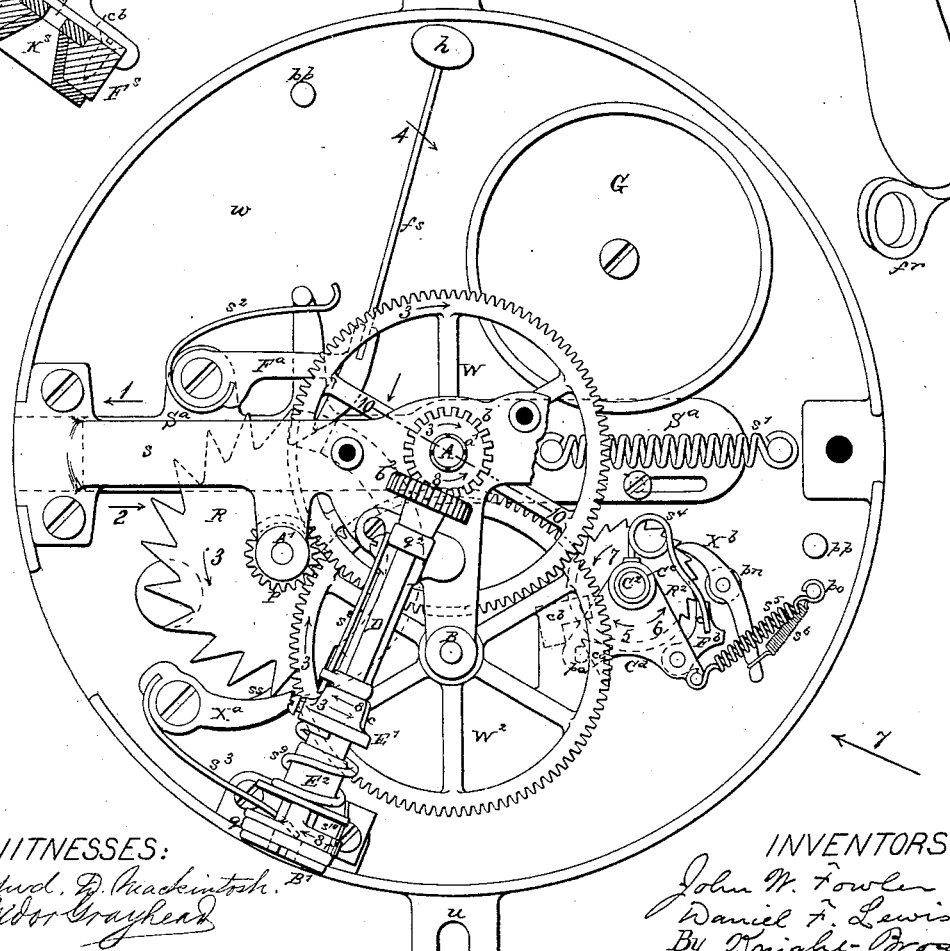
WITNESSES:
INVENTORS:
John W. Fowler
Daniel F. Lewis
By Knight Bros
Attorneys.
N. PETERS, PHOTO-LITHOGRAPHER, WASHINGTON, D.C.

3 Sheets—Sheet 3.
J. W. FOWLER & D. F. LEWIS.
Passenger-Register.
No. 206,553. Patented July 30, 1878.
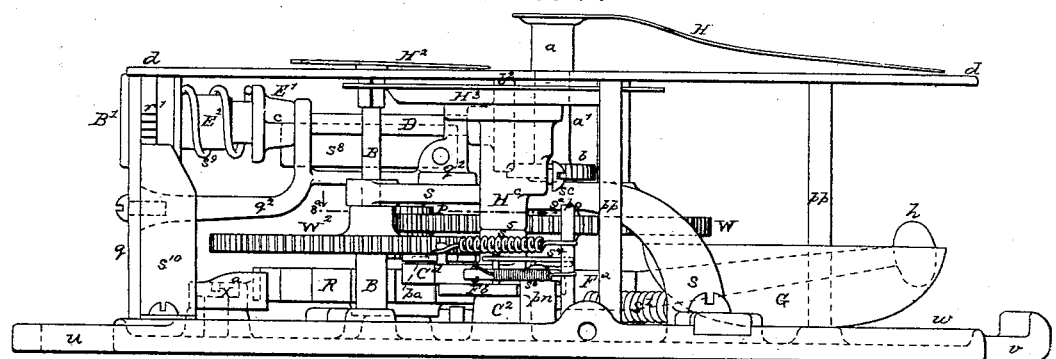
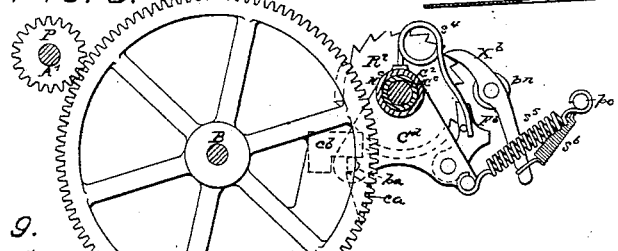
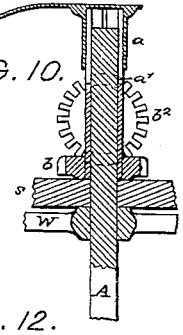
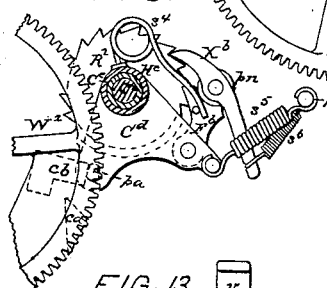
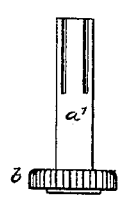
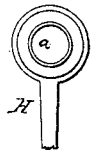
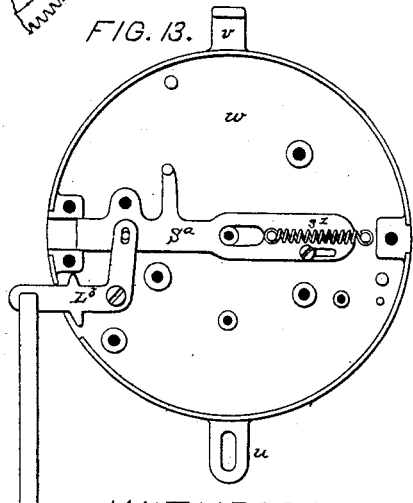
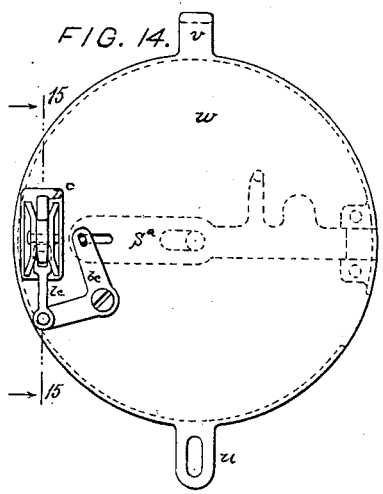
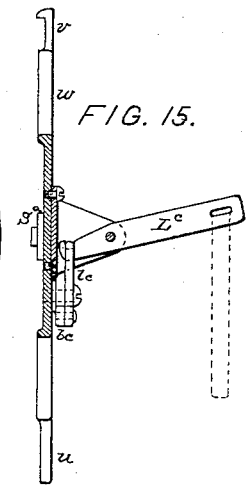
WITNESSES:
Edwd. D. Mackintosh.
Gidor Grayhead
INVENTORS:
John W. Fowler
Daniel F. Lewis
By Knight Bro.
Attorneys.
N. PETERS, PHOTO-LITHOGRAPHER, WASHINGTON, D. C.

UNITED STATES PATENT OFFICE.

JOHN W. FOWLER AND DANIEL F. LEWIS, OF BROOKLYN, NEW YORK.

IMPROVEMENT IN PASSENGER-REGISTERS.

Specification forming part of Letters Patent No. 206,553, dated July 30, 1878; application filed April 22, 1878.

*To all whom it may concern:*

Be it known that we, JOHN W. FOWLER and DANIEL F. LEWIS, both of the city of Brooklyn, in the county of Kings, New York, have jointly invented a new and useful Improvement in Passenger-Registers, of which the following is a full, clear, and exact specification.

This invention, like that of our application for patent filed May 22, 1877, and renewed January 29, 1878, relates primarily to the modification and perfection of our register, known as the "Alarm," patented April 24, 1877, United States Patent No. 190,021, but may be embodied in other registers.

Our present invention consists, first, in an improved device for actuating a passenger-register from any part of a street-car or its platforms. The conductor is provided with a key-wedge, which he thrusts into any one of a series of sockets in a face-strip or its equivalent, attached to the side or roof of the car, and into and partially through one of a like series of longitudinal slots in a sliding bar guided by said face-strip or its equivalent, and actuated by said wedge, in combination with a retracting-spring or its equivalent, said slots being so located with reference to said sockets as to be drawn into line with the latter by each thrust of said wedge, said slotted bar to be connected to the main slide or its equivalent within the register, with or without media for changing the direction of the motion of said bar, and with or without provision for preventing lost motion.

Our present invention consists, furthermore, in the employment of a double detent-pawl in connection with our combined feed-pawl and hammer and the said key-wedge-actuating device, to prevent striking the bell by a partial movement of the slotted bar.

Our present invention consists, also, in provision for correcting a rotary hundreds-dial with reference to the index-aperture, through which its figures appear, and for exposing its operating mechanism, in order to facilitate repairs, said rotary dial being attached to a sleeve-hub, which is clamped upon the hundreds-shaft by means of a set-screw.

Our present invention consists, also, in a novel mechanism for instantaneously operating a hundreds-register at the proper moments the essential parts of said novel mechanism being a cam revolving once per hundred units, and a bell-crank carrying at one extremity a stud engaging with said cam, and at its other extremity a spring-pawl engaging with a ratchet-wheel on the shaft of the hundreds-dial or its equivalent, in combination with a spring for actuating said crank to turn said ratchet-wheel when said crank is tripped by said cam, a stop and detent being employed to control the motion of the ratchet-wheel, so as to insure accuracy.

Our present invention consists, also, in a safety-cam following said hundreds-cam, so as to operate the said bell-crank, and therethrough the said ratchet-wheel and hundreds-register, by positive pressure in the event of the failure of said actuating-spring.

Our present invention consists, lastly, in arranging the central gear of the setting mechanism behind the driving-gear instead of in front thereof, and in providing said central gear with a long split hub, which embraces the main shaft with the requisite tightness, and affords a like ample hold for the frictional hub of the trip-hand, said central gear being held in place by said driving-gear itself without the aid of any set-screw or other retaining device, as hereinafter more fully set forth.

Figure 2:
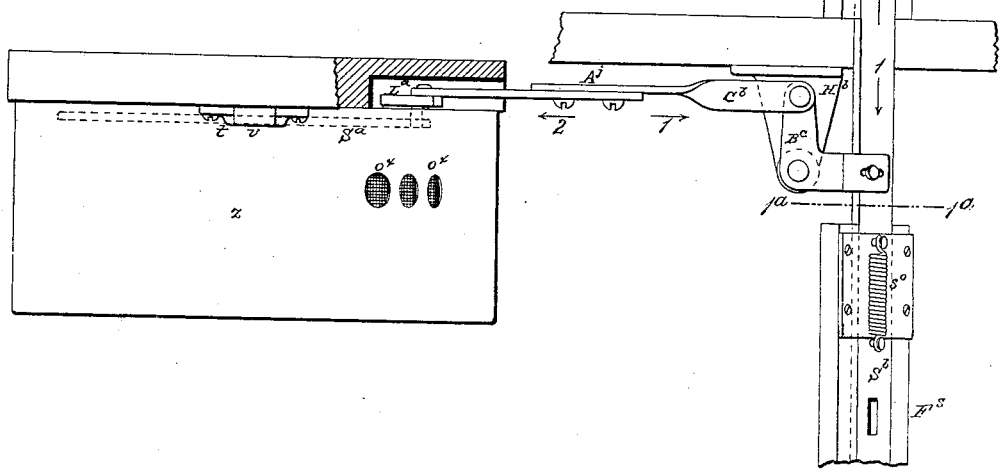

Figure 1 of the accompanying drawing is a face view of an alarm-register actuated by a slotted bar according to this invention, said bar being shown in cross-section on the line $1^a\ 1^a$, Fig. 2. Fig. 2 is a top view of the same, showing a like view of said slotted bar and its appurtenances. Fig. 3 is a larger face view of a portion of the face-strip and one of the sockets belonging to said slotted bar; and Figs. 4, $4^b$ are sections on the lines $4^a\ 4^b$, Fig. 3; and Fig. 5 is a perspective view of the key-wedge which actuates said slotted bar. Fig. 6 is a face view of the register proper, with case, index-hands, dials, and certain other parts removed to expose the inner parts. Fig. 7 is an edge view of the register complete, except its case, looking in the direction of the arrow $7^a$, Fig. 6. Figs. 8 and 9 are sectional face views of the hundreds-carrying mechanism, the plane of the section being the line $8^a\ 9^a$, Fig. 7. Fig. 10 is an axial section of the trip-hand and certain other parts, in the plane indicated by the line 10 10, Fig. 6. Fig. 11 is an elevation of the setting-gear, (shown in section in Fig. 10;) and Fig. 12 is a back view of the hub of the trip-hand. Fig. 13 is a small face view of the back-plate and slide of the register, showing a substitute actuating device for use where the passengers are to be registered as they enter. Fig. 14 is a back view of said back-plate, showing another substitute actuating device for use on fare-box cars and the like; and Fig. 15, an edge view of the parts shown in Fig. 14, partly in section, on the line 15 15. Figs. 1 and 2 are drawn to one scale; Figs. 3 to 12, inclusive, are drawn to a larger scale; and Figs. 13, 14, 15, to another smaller scale.

Like letters of reference indicate the same parts in the several figures, and the motions of the respective parts are indicated by arrows, correspondingly numbered in all the figures.

The register proper, corresponding with those described in our previous specifications hereinbefore referred to, has a circular inclosing-case, consisting of a sheet-metal drum, $z$, and a glass face-plate, $y$. A dial-plate, $d$, marked with dials $d^1$ $d^2$, and having an index-orifice, $o^3$, is supported parallel to said glass face-plate. Units to one hundred are registered synchronously on both dials by means of index-hands H H$^2$. Hundreds are registered at the proper moments by a rotary dial, H$^3$, of twenty spaces, whose figures appear successively through said index-orifice $o^3$. An alarm-gong, G, is struck after the registration of each unit. Provision is made for setting the trip-hand at zero at will, independently of the other mechanism, and additional provision is made against so manipulating said trip-hand as to accomplish fraud.

The general features above mentioned, with all the mechanical devices described in our said previous specifications, or shown in the drawings accompanying said previous specifications, are not intended to be claimed as parts of the present invention; and to facilitate comparing this specification with said previous specifications the correspondence of letters of reference which exists in said previous specifications will be continued in this one.

The registering motions are all imparted by or through the medium of a reciprocating slide, S$^a$, with a retracting-spring, $s^1$, for which, respectively, a lever and a weight might be substituted without difference in result.

To provide for imparting motion to the slide S$^a$ or its equivalent from any part of a street-car or its platforms, a stud-pin is attached to the back of said slide, a slot is formed in the back-plate $w$ to accommodate said pin, and a bell-crank lever, L$^a$, Fig. 1, is attached by a pivotal screw to the back of said back-plate, a slot in one end of said lever receiving said pin, while the other end of said lever is simply perforated to provide for the pivotal attachment of a connecting-bar, C$^b$. The latter extends to a bell-crank, B$^c$, which is pivoted in a housing, H$^b$, attached by screws to the end of the car, near the roof or side wall. In the cars now fitted with this device said connecting-bar extends horizontally, and said housing is located near the roof, in line therewith. A slotted bar, S$^b$, is fitted to extend the entire length of the car and platforms in line with said bell-crank B$^c$, to which it is coupled, and is supported parallel to the adjacent portion of the roof by a face-strip, F$^s$, in which it slides longitudinally. Said face-strip also supports a series of key-sockets, K$^s$, in front of the respective slots, but so that only the front end of each slot is exposed. Said sockets are attached by screws, and taper inward to the bar S$^b$, as shown in Figs. 3, 4, 4$^b$. To the back of the face-strip, except at the points where the latter itself is supported, cross-bars $c$ $b$ are attached to form abutments behind the slotted bar, and the face-strip is attached to the ribs of the roof by small brackets B$^b$, as shown in Fig. 4$^b$. A key-wedge, K$^w$, Fig. 5, provides for imparting the requisite motion. The bit of this key is a short wedge of variable shape, secured in one end of a handle of variable shape, the latter to be finished with or without a finger-ring, $f$ $r$, swiveled thereto, for suspending the key while making change.

The conductor thrusts the key-wedge into the nearest key-socket and into the communicating slot of the sliding bar S$^b$, the wedging bit penetrating between the fixed rear end of the socket and the front end of the slot until the bar is moved the requisite distance, as determined with sufficient margin by the width of the bit. A single thrust accomplishes this movement instantaneously. The key-handle, at the inner end of the bit, may be adapted to come in contact with the face of the key-socket as a stop; or it may be beveled so as to stop against the inner walls of the socket. The latter is preferred.

The spring $s^1$ of the slide S$^a$ tends to retract the slotted bar S$^b$ for its effective stroke, and may be rendered sufficient therefor; but we prefer to employ an aiding-spring, $s^o$, as illustrated in Fig. 2. For this purpose a spiral spring is attached at one end to a metallic plate, which is attached by screws to the back of the face-strip F$^s$, and at its other end said spring is attached to a stud-pin projecting from the back of the slotted bar S$^b$, the latter pin, with said plate, serving additionally to arrest the effective motion of said bar at the proper point to keep the slots properly exposed within the sockets K$^s$.

To prevent lost motion of the slotted bar and its connections, the connecting-bar C$^b$ is divided, lapped, slotted, and united by set-screws, as shown at A$^j$, Figs. 1 and 2, to provide for readily adjusting the same. Any of the well-known equivalents of the adjusting-joint A$^j$ may be employed, if preferred.

The parts L$^a$, B$^c$, H$^b$, and K$^s$ are intended to be iron or brass castings; the face-strip F$^s$, wooden; the bars F$^b$ and C$^b$, of thin bar-iron or band-iron; the bit of the key K$^w$, of steel;

its handle, wooden; and the other parts of this mechanism of iron, steel, or brass; but these and like details are not considered essential. The motions of the bars $S^b$ $C^b$ and of the slide $S^a$ therewith are indicated by arrows 1 2.

In the registration of units and sounding alarms, as aforesaid, the slide $S^a$, in its forward stroke, (indicated by arrows 1,) imparts motion, through a feed-pawl, $F^a$, a ratchet-wheel, R, of twenty teeth, and a rotary shaft, A′, to a pinion, P, of twenty teeth, and thence through spur-wheels W $W^2$, of one hundred teeth each, to parallel shafts A B, which carry the index-hands H $H^2$. In the return movement of said slide $S^a$, (indicated by arrows 2,) said feed-pawl $F^a$ is retracted, and in riding over the next tooth of the ratchet-wheel R and dropping into the next interdental notch, said feed-pawl $F^a$, by means of a hammer, $h$, combined therewith, strikes the gong G, the tail-spring $s^2$ of the combined feed-pawl and hammer being efficiently assisted by the springs $s^1$ $s^6$, or their equivalents. The step-by-step registering motions of the index-hands and their train are indicated by arrows 3; the striking motion of the hammer, by arrow 4.

To facilitate the manufacture of a combined feed-pawl and hammer of superior efficiency, a flat shank, $f\ s$, of spring-brass or spring-steel, is employed, and the body of the pawl and the hammer-knob are cast thereon, as indicated in Fig. 6, the head of the pawl being in this case extended to receive said shank.

A detent-pawl, $X^a$, having a tail-spring, $s^3$, engages with the ratchet-wheel R at another point, and this pawl is now provided with a supplemental shoulder, $s\ s$, which engages with the advancing tooth at half-stroke, more or less, and thus precludes sounding the alarm without registering by releasing the slide prematurely, the feed-pawl and hammer being so tilted by the back of the tooth over which it should ride as to keep the hammer-knob out of reach of the gong.

The shaft $C^c$ of the hundreds-dial $H^3$ is a sleeve-shaft, supported by a stud-shaft, $C^2$, and carrying a ratchet-wheel, $R^2$, of twenty teeth, fast thereon. In the present improvement the outer part of this shaft is made plain, and fitted with a sleeve-hub, $H^c$, clamped thereon by a set-screw, $s\ c$, the dial being attached to the face of this hub by a screw or screws, and to the undercut outer end of the stud-shaft $C^2$ by a key-hole slot, as in our previous machines. Provision is thus made for readily adjusting the hundreds-dial so that its figures will appear properly through the index-orifice $o^3$, and also for exposing the parts beneath, as in Fig. 6, to facilitate repairs.

For actuating the feed-pawl $F^b$, which meshes with the ratchet-wheel $R^2$, and drives therewith the hundreds-shaft $C^c$ and dial $H^3$, an entirely new device is provided. A pair of cam projections, $c\ a$, $c\ b$, are formed on or attached to the spur-wheel $W^2$, at or near its perimeter, and a stud-pin, $p\ a$, adapted to engage with said cams, is formed on or attached to one extremity of a rocking bell-crank, $C^d$, which is mounted loosely on the shaft $C^c$, said feed-pawl $F^b$ being pivoted to the other extremity of said crank, with its spring $s^4$ attached to the hub of the crank and applied to a stud-pin on the pawl. A post, $p\ o$, projecting from the back-plate $w$, forms a fixed point of attachment for a spiral spring, $s^5$, attached to the pawl end of the bell-crank $C^d$, and for a smaller spring, $s^6$, of the same form, which actuates a detent-pawl, $X^b$. Said detent-pawl engages with the ratchet-wheel $R^2$, and is pivoted on a short post or stud, $p\ n$, which also forms a locking-stop for the feed-pawl $F^b$.

In the rotation of the spur-wheel $W^2$, (indicated by arrows 3,) the cam $c\ a$ engages with the pin $p\ a$ once per revolution, and thereby turns the bell-crank $C^d$ gradually in the direction of arrows 5 until the feed-pawl $F^b$ passes over one tooth of the ratchet-wheel $R^2$, as illustrated in Fig. 6; and as the permanent hand approaches 0 after leaving 99, said cam passes out of contact with said pin, as illustrated in Fig. 8. In the absence or failure of the spring $s^5$, the safety-cam $c\ b$ engages with said pin $p\ a$ and forces the same outward, so as to impart to said bell-crank and feed-pawl their effective stroke. (Indicated by arrows 6.) This stroke will, however, in practice, with scarcely the possibility of a failure, be imparted by the spring $s^5$ immediately the bell-crank is released by the cam $c\ a$, so that the numbers on the dial $H^3$ will succeed each other instantaneously in the index-orifice $o^3$ at the proper moments to register hundreds. The step-by-step motion of the ratchet-wheel $R^2$, shaft $C^c$, hub $H^c$, and dial $H^3$ is indicated by arrows 7. The position of the parts at the end of a registration is illustrated by Fig. 9. The end of the feed-pawl $F^b$ is now in contact with the post $p\ n$, so as to preclude forward motion of the ratchet-wheel $R^2$, while the detent-pawl $X^b$ precludes backward motion of the same, which is thus securely locked against accidental displacement.

The trip-hand H is not applied directly to the shaft A, but to the extended hub $a^1$ of a small gear-wheel, $b$, of twenty teeth, said hub being split and contracted, so as to be connected to said shaft by friction, in order that the trip-hand may be set at zero at will independently of said shaft, while the hub $a$ of the trip-hand is likewise connected to said gear-hub by friction, so that the trip-hand can be readily adjusted with reference to the zero-guard without regard to the mesh of said gear $b$ with its mate $b^2$, of twenty teeth.

For operating the trip-hand independently of the shaft A, a radial setting-shaft, D, is provided. This shaft is supported in bearings in a supplemental frame, $q\ q^2$, attached to the main frame $s$, and carries the gear $b^2$ at its inner end. A key-guard, $B'\ r'\ s^{10}$, is supported immediately within a key-hole in the drum $z$ by the bracket $q$ of said frame $q\ q^2$. A key-clutch, $E^1\ E^2\ s^9$, concentric with said key-box, is carried by the outer end of said shaft D; and a zero-guard is formed by a projection, $c$, on the inner sleeve, $E^1$, of said key-clutch, and a stop-spring, $s^8$, attached to said frame $q$ $q^2$.

The gear $b$, in the present improvement, is arranged behind the driving-gear $b^2$, being seated directly upon the frame $s$, as shown in Fig. 10. This arrangement obviates grooving or tapping the shaft A and simplifies the construction of the other parts, one set of slits in the hub or sleeve of the gear $b$ answering for it and also for the hub of the hand H, as illustrated by Figs. 11 and 12. Except as modified in position, owing to this peculiar arrangement of the wheel $b$, and as modified in unessential details of mechanical construction, the parts of the mechanism for setting the trip-hand and for preventing any falsification of the permanent record are identical with those described in our last previous specification, hereinbefore referred to, and any detailed description thereof is consequently omitted here.

The motion of the setting-gears $b$ $b^2$ and shaft D and the parts attached to the latter, with the shaft A and trip-hand H, while registrations are being made, is indicated by arrows 3. That of these parts, with the key-box B', when the setting-key is inserted and turned so as to carry the trip-hand backward to zero, is indicated by arrows 8.

The key-hole is located near the bottom of the case in the present machine, as indicated by the location of the key-box bracket $q$, and a pair of posts, $p$ $p$, $p$ $p$, form, with said bracket, three equidistant supports for the margin of the dial-plate $d$.

In the hands of different manufacturers, for example, and in applying the register to different uses, various modifications in detail, besides those herein specified, may be made without departing from the respective parts of our invention.

Certain modifications which we make in applying the register to different styles of street-car are illustrated in Figs. 13, 14, 15. In either of these cases our peculiar key-wedge actuating device is omitted, and the register is actuated in the first instance, Fig. 13, by means of a bell-crank lever, $L^b$, as proposed in our last previous specification. This lever, in the present modification, is connected at one end to the slide $S^a$ by a stud-pin working in a slot, and is attached by a pivotal screw to the face of the back-plate, and its free end projects through a slot in the edge of the case, and is provided with projections, which guard said slot in the case, so as to prevent any access to the works therethrough. This form of lever is intended to be operated by means of a strap, as shown, the passengers to be registered as they enter.

The modification illustrated in Figs. 14, 15 is designed for cars and other vehicles on which the fares are collected by the driver, or where fare-boxes are used, and the lever $L^c$, which is likewise worked by a strap, is pivoted in a housing on the back of the back-plate, so as to project through the end wall of the car to the driver's platform. The lever in this case projects at right angles to the back-plate of the register, and is connected to the slide $S^a$ through the medium of a link, $l$ $c$, and bell-crank $b$ $c$, as clearly shown, said bell-crank being connected to the slide, as in the first device, by means of a stud-pin projecting through a slot in the back-plate.

The back-plate and slide are preferably cast, as indicated, so as to accommodate either of the actuating devices above described; and other actuating devices may be employed, if preferred, in connection with a register having either of the features of internal construction hereinafter claimed.

Our key-wedge actuating device above specified may likewise be employed in connection with other registers, but is peculiarly designed and adapted to operate in combination with our improved register, as hereinbefore set forth.

The following is what we now claim as new and of our own invention, and desire to secure by Letters Patent, namely:

1. The combination, with a passenger-register, of a sliding bar drawn longitudinally in one direction by a spring or its equivalent, a fixed key-socket communicating with a slot in said bar, and a key-wedge adapted to actuate said bar by being simply thrust into said slot through said socket and then withdrawn.

2. An actuating device for passenger-registers, consisting of a slotted bar of the required length drawn longitudinally in one direction by a spring or its equivalent, a series of fixed key-sockets communicating with the slots in said bar, and a key-wedge adapted to actuate said bar by being simply thrust into either of said slots through the communicating socket and then withdrawn.

3. A sliding actuating-bar drawn longitudinally in one direction by a spring or its equivalent, and driven in the opposite direction by means of a key-wedge thrust into either one of a series of slots in said bar through a communicating fixed socket, in combination with a face-strip, which supports said bar, and also said sockets, as herein specified.

4. A sliding actuating-bar drawn longitudinally in one direction by a spring or its equivalent, and driven in the opposite direction by means of a key-wedge thrust into either one of a series of slots in said bar through a communicating fixed socket, in combination with a bell-crank, a connecting-bar, and a bell-crank lever, for transmitting motion from said bar to a register-slide or its equivalent at right angles to said slotted bar.

5. A sliding actuating-bar drawn longitudinally in one direction by a spring or its equivalent, and driven in the opposite direction by means of a key-wedge thrust into either one of a series of slots in said bar through a communicating fixed socket, in combination with a bell-crank, a connecting-bar, and a bell-crank lever, for transmitting motion from said bar to a register-slide or its equivalent, said connecting-bar having an adjusting-joint to prevent lost motion.

6. The combination of a sliding actuating-bar drawn longitudinally in one direction by a spring or its equivalent, and driven in the opposite direction by means of a key-wedge thrust into a slot in said bar through a communicating fixed socket, and a register-slide or its equivalent, carrying a combined feed-pawl and hammer, to which motion is thus transmitted, the registration of a unit being effected by one motion of said parts, and an alarm struck at the end of each return motion, substantially as herein set forth.

7. The combination of a sliding actuating-bar drawn longitudinally in one direction by a spring or its equivalent, and driven in the opposite direction by means of a key-wedge thrust into a slot in said bar through a communicating fixed socket, with a register-slide, or its equivalent, a combined feed-pawl and hammer carried by said slide, a ratchet-wheel driven by said pawl, and a double detent-pawl engaging with said ratchet-wheel, so as to cause the latter to throw back the hammer of said feed-pawl after a partial stroke, as herein specified.

8. The combination of a rotary hundreds-shaft driven at its inner or rear end by a hundreds-carrying mechanism, a hundreds-dial at the outer end of said shaft, and an interposed sleeve-hub adjustable upon said shaft by means of a set-screw, and removable therefrom, substantially as herein illustrated and described, for correcting said dial and exposing said carrying mechanism without disturbing the latter.

9. In combination with a rotary hundreds-dial or its equivalent, a ratchet-wheel on the shaft of the same and a feed-pawl engaging with said ratchet-wheel, a rocking bell-crank carrying said pawl, a cam revolving once per hundred units and engaging with a stud-pin on said crank, and a spring for instantaneously actuating said wheel through the medium of said pawl and crank when the latter is released by said cam, substantially as herein shown and described.

10. In combination with a rotary hundreds-dial or its equivalent, a ratchet-wheel on the shaft of the same and a feed-pawl engaging with said ratchet-wheel, a rocking bell-crank carrying said pawl, a cam revolving once per hundred units and engaging with a stud-pin on said crank, a spring for instantaneously actuating said wheel through the medium of said pawl and crank when the latter is released by said cam, and a stop-stud engaging with said pawl to arrest its effective motion, substantially as herein specified.

11. In combination with a rotary hundreds-dial or its equivalent, a ratchet-wheel on the shaft of the same and a feed-pawl engaging with said ratchet-wheel, a rocking bell-crank carrying said pawl, a cam revolving once per hundred units and engaging with a stud-pin on said crank, a spring for instantaneously actuating said wheel through the medium of said pawl and crank when the latter is released by said cam, and a detent-pawl to prevent retrograde motion of said ratchet-wheel, substantially as herein shown and described.

12. In combination with a rotary hundreds-dial or its equivalent, a ratchet-wheel on the shaft of the same and a feed-pawl engaging with said ratchet-wheel, a rocking bell-crank carrying said pawl, a cam revolving once per hundreds units and engaging with a stud-pin on said crank, a spring for instantaneously actuating said wheel through the medium of said pawl and crank when the latter is released by said cam, a detent-pawl to prevent retrograde motion of said ratchet-wheel, and a stop-stud engaging with said feed-pawl to arrest its effective motion, as herein described, for the purpose set forth.

13. In combination with a rotary hundreds-dial or its equivalent, a ratchet-wheel on the shaft of the same and a feed-pawl engaging with said ratchet-wheel, a rocking bell-crank carrying said pawl, a cam revolving once per hundreds units and engaging with a stud-pin on said crank, and a safety-cam following said main cam to oscillate said crank in the event of any failure of its retracting-spring.

14. In combination with a trip-hand adapted to be set at zero at will independently of the registering mechanism and a radial setting-shaft having a fixed gear at its inner end, a matching-gear on the trip-hand shaft arranged behind said fixed gear, so as to be held in place thereby, and constructed with a frictional sleeve-hub, to the outer end of which said trip-hand is attached.

15. In combination with a radial setting-shaft having a fixed gear at its inner end, a matching-gear on the trip-hand shaft, arranged behind said fixed gear and constructed with a frictional hub, and a trip-hand attached by a frictional hub to said frictional hub of said gear, as herein specified, for the purposes set forth.

JNO. W. FOWLER.
DANIEL F. LEWIS.

Witnesses:
THOS. P. WRIGHT, Jr.,
F. G. ARCHER,
JAS. L. EWIN.